April 28, 1959
R. S. ZEBARTH
2,884,233
CIRCULATOR FOR LIQUID TANKS
Original Filed June 21, 1954
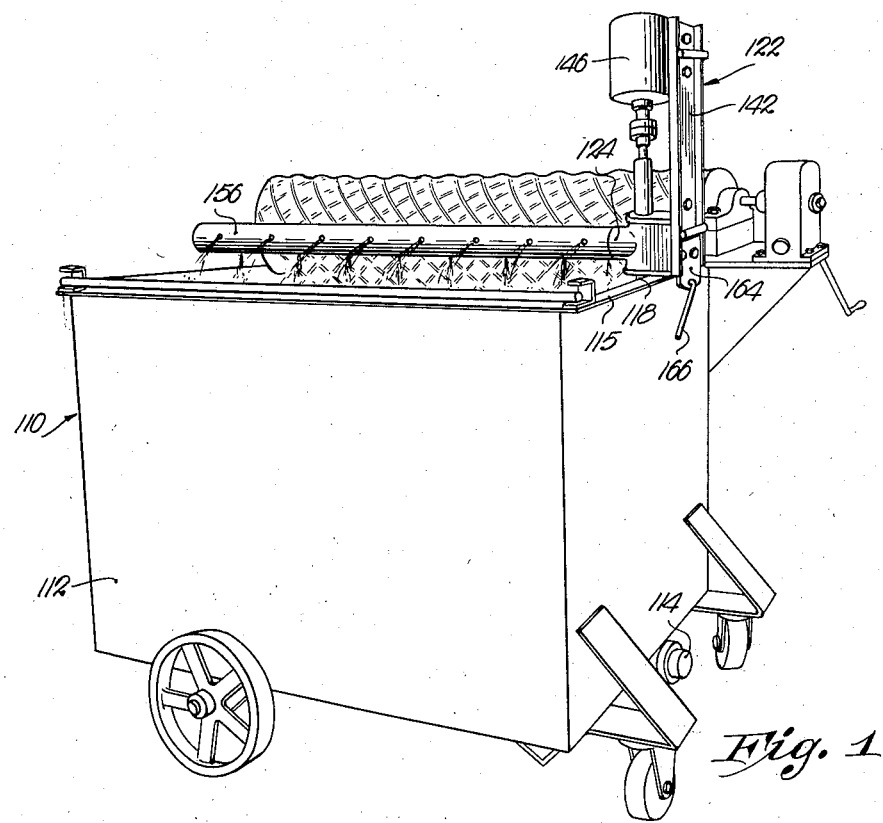
Fig. 1.
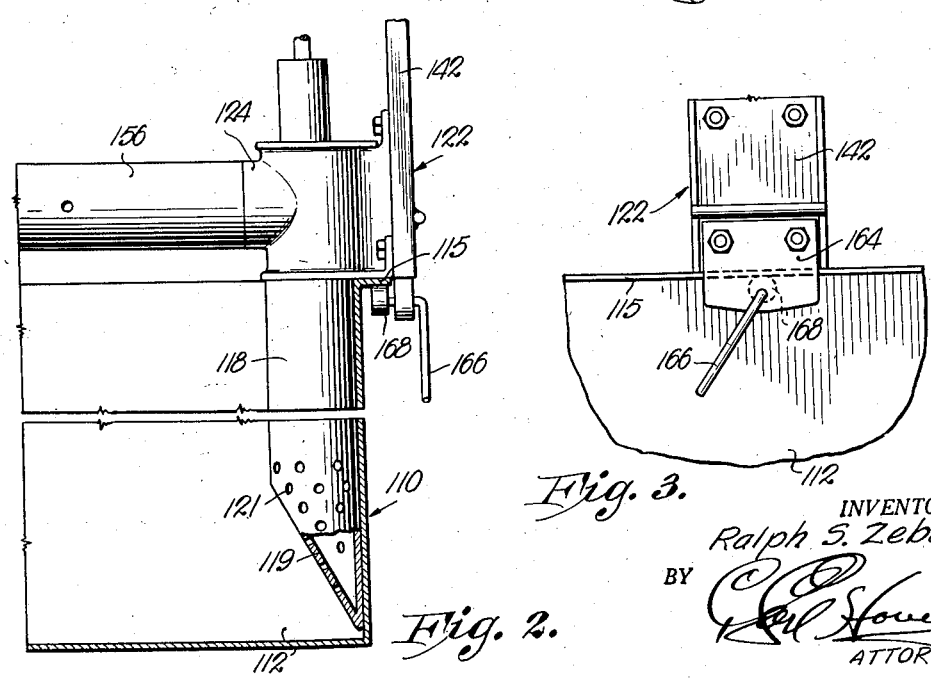
Fig. 2.
Fig. 3.
INVENTOR.
Ralph S. Zebarth
BY
ATTORNEY.

2,884,233

CIRCULATOR FOR LIQUID TANKS

Ralph S. Zebarth, Hickman Mills, Mo., assignor to Gordon Johnson Equipment Company, Kansas City, Mo., a corporation of Missouri Original application June 21, 1954, Serial No. 437,910, now Patent No. 2,779,052, dated January 29, 1957. Divided and this application September 10, 1956, Serial No. 608,995

3 Claims. (Cl. 259—95)

This invention relates to improvements in equipment used in the processing of poultry, in the nature of that disclosed in U. S. Letters Patent No. 2,637,066, in the name of Gordon W. Johnson, issued May 5, 1953, and is a division of my copending application Serial No. 437,910, filed June 21, 1954, now Patent No. 2,779,052 dated January 29, 1957.

The circulator forming the subject matter of the instant invention includes a recirculating pump assembly for poultry chilling apparatus in the nature of that covered by the aforesaid patent, capable of recirculating, and therefore, agitating the cold water used in the chilling apparatus, and usable interchangeably on any one of a number of tanks.

An important object of the instant invention is to provide a pump unit that may be quickly and easily slipped into place in operative relationship to a poultry chilling tank without requiring modification of the tank in any manner.

Another important object of the present invention is the provision of a circulator that includes in a single unit, an inlet pipe that extends into the water of the tank, a perforated manifold that overlies the tank and a pump unit for circulating the water, all attached to the tank through novel quickly-releasable clamp means engageable with a flange on the tank.

Other objects include important details of construction, all of which will be made clear as the following specification progresses.

In the drawing:

Figure 1 is a perspective view of a circulator for liquid tanks made pursuant to the present invention.

Fig. 2 is an enlarged, fragmentary, cross-sectional view through the tank shown in Fig. 1, illustrating the manner of releasably mounting the circulator thereon; and Fig. 3 is an enlarged, fragmentary, elevational view illustrating the releasable means of attachment for the circulator.

The poultry chilling apparatus shown in Fig. 1 of the drawings and broadly designated by the numeral 110 is essentially the same as that forming the subject matter of said Patent No. 2,637,066, and therefore, said patent disclosure is incorporated herein by reference for a complete understanding of the operation and use thereof.

It may be pointed out that the apparatus 110 includes an open top tank 112 adapted to contain water that may be chilled through use of cracked ice. Tank 112 is provided with drain means 114 and has an out-turned flange 115 at the uppermost edge thereof.

The recirculating system includes an elongated pipe 118 disposed within the tank 112 and terminating near the bottom thereof as shown in Fig. 2. The lowermost end of the pipe 118 is provided with a sloping plate 119 having a plurality of openings 121, which openings or perforations extend upwardly into the circular portion of the pipe 118.

A unitary pump assembly broadly designated by the numeral 122 is virtually identical with the pump unit disclosed in my said copending application in that it is provided with a pump housing 124 from which extends a removable, tubular, perforated manifold 156. The pump (not shown) which is driven by electric motor 146, extends through the housing 124 into the pipe 118 in substantially the same way as pump means of said copending application. Upstanding bracket 142 supports the motor 146 and encloses the outer end of the housing 124, and it is upon the lowermost end of the bracket 142 that there is provided quickly releasable means for attaching the entire unit to the tank 112.

A plate 164 bolted or otherwise secured to the bracket 142 receives an L-shaped, swingable handle 166 having a cam 168 rigidly secured thereto for engagement with the flange 115 therebelow.

Pipe 118 is screw-threaded into the lowermost end of the housing 124 or otherwise secured thereto. Consequently, upon release of the locking means 166—168, the entire unit including the pipe 118, may be removed from the tank 112 and repositioned for use in another tank. Notable particularly in Fig. 2 of the drawing is the fact that housing 124 rests directly upon the flange 115 and when the handle 166 is swung to the position shown in Fig. 3, the flange 115 will be clamped tightly between cam 168 and the housing 124.

It is seen in Figure 1 of the drawing that in normal operation, when the assembly 122 is supported by the tank 112, manifold 156 extends longitudinally of the tank 112 thereabove. Thus, when prime mover 146 is coupled with a source of electrical energy to operate the pump, water will be drawn upwardly through the pipe 118 and be discharged back into the tank 112 through the perforations of manifold 156. It is, of course, understood that the level of water in the tank 112 is maintained above the pump in pipe 118.

A further important feature of the recirculating system hereinabove described, lies in the way in which the entire assembly 122 may be easily and quickly removed from the tank 112. Thus, through use of a single unit 122, one poultry chilling apparatus may be operating to chill the poultry through use of the recirculating system of the instant invention while other tanks are being loaded with poultry and ice and while workmen are removing the birds from tanks that have previously been placed in use to quickly and efficiently chill the birds.

It can be appreciated that by recirculation of the cold water, the body heat of the birds is more quickly removed and that because of the quick and ready removability of the unit 122, it is unnecessary to provide a pumping arrangement for each of several chilling tanks. The entire operation therefore is speeded up and such factor is extremely important in this particular industry.

Having thus described the invention what is claimed as new and desired to be secured by Letters Patent is:

1. A water circulating attachment for an open top poultry chilling tank having a bottom and an upright side wall, said attachment including an L-shaped assembly having a hollow pump housing adapted to rest upon the upper edge of said side wall exteriorly of the tank, a vertical water inlet pipe communicating with the housing in depending relationship thereto and adapted for disposition within the tank in engagement with the innermost face of said wall, terminating in a lowermost end having water inlet perforations disposed below the level of water in the tank, and an elongated, tubular, perforated water outlet manifold exteriorly of the tank communicating with the housing and extending horizontally therefrom for disposition above said level of water; an elongated bracket exteriorly of the tank secured to the housing in opposed relationship to the manifold and extending upwardly from the housing; a pump and a motor therefor mounted on the innermost face of the bracket adjacent the uppermost end of the latter, spaced directly above the housing exteriorly of the tank, and provided with a shaft depending therefrom and extending into said housing in vertical alignment with said pipe; and quickly releasable structure on the outermost face of the bracket at the lowermost end of the latter and engageable with the tank for clamping the housing to the tank and holding the pipe in engagement with said wall, whereby the manifold, the pipe, the bracket and the motor are all supported by the tank solely through said housing.

2. A water circulating attachment for an open top poultry chilling tank having a bottom and an upright side wall provided with an outwardly extending flange at the uppermost edge thereof, said attachment including an L-shaped assembly having a hollow pump housing adapted to rest upon the said flange exteriorly of the tank, a vertical water inlet pipe communicating with the housing in depending relationship thereto and adapted for disposition within the tank in engagement with the innermost face of said wall, terminating in a lowermost end having water inlet perforations disposed below the level of water in the tank, and an elongated, tubular, perforated water outlet manifold exteriorly of the tank communicating with the housing and extending horizontally therefrom for disposition above said level of water; an elongated bracket exteriorly of the tank secured to the housing in opposed relationship to the manifold and extending upwardly from the housing; a pump and a motor therefor mounted on the innermost face of the bracket adjacent the uppermost end of the latter, spaced directly above the housing exteriorly of the tank, and provided with a shaft depending therefrom and extending into said housing in vertical alignment with said pipe; and quickly releasable structure on the outermost face of the bracket at the lowermost end of the latter and engageable with the flange for clamping the housing to the flange and holding the pipe in engagement with said wall, whereby the manifold, the pipe, the bracket and the motor are all supported by the tank solely through said housing.

3. A water circulating attachment as in claim 2, said structure comprising a device swingably carried by the bracket and having a cam rotatable into engagement with the flange therebeneath as the device is swung.

References Cited in the file of this patent
UNITED STATES PATENTS

| | | |
|---|---|---|
| 1,342,947 | Duncan | June 8, 1920 |
| 2,746,467 | Dempsey et al. | May 22, 1956 |
| 2,749,073 | Guysi et al. | June 5, 1956 |